(12) United States Patent
Nagel et al.

(10) Patent No.: US 11,194,213 B2
(45) Date of Patent: Dec. 7, 2021

(54) ELECTROCHROMIC PANEL TRANSMISSION LEVEL SYNCHRONIZATION

(71) Applicant: Kinestral Technologies, Inc., South San Francisco, CA (US)

(72) Inventors: Paul Nagel, South San Francisco, CA (US); Wally Barnum, South San Francisco, CA (US); Jason Litzinger, South San Francisco, CA (US); Luis Gomez, South San Francisco, CA (US); Steve Coffin, South San Francisco, CA (US)

(73) Assignee: HALIO, INC., Hayward, CA (US)

( * ) Notice: Subject to any disclaimer, the term of this patent is extended or adjusted under 35 U.S.C. 154(b) by 465 days.

(21) Appl. No.: 15/820,867

(22) Filed: Nov. 22, 2017

(65) Prior Publication Data

US 2018/0143501 A1    May 24, 2018

Related U.S. Application Data

(60) Provisional application No. 62/426,130, filed on Nov. 23, 2016, provisional application No. 62/511,267, filed on May 25, 2017.

(51) Int. Cl.
*G02F 1/163* (2006.01)
*E06B 9/24* (2006.01)
*G05B 15/02* (2006.01)

(52) U.S. Cl.
CPC .............. *G02F 1/163* (2013.01); *E06B 9/24* (2013.01); *G05B 15/02* (2013.01);
(Continued)

(58) Field of Classification Search
CPC .......... G02F 1/163; G02F 1/155; G02F 1/153; G02F 1/15; G02F 1/1533; G02F 1/157;
(Continued)

(56) References Cited

U.S. PATENT DOCUMENTS

2004/0047050 A1    3/2004  Bauer et al.
2006/0245024 A1*  11/2006  Greer ..................... G02F 1/163
                                                                  359/265
(Continued)

FOREIGN PATENT DOCUMENTS

WO        2016044187 A1    3/2016
WO    WO-2016044187 A1 *   3/2016  .......... G09G 3/2007
(Continued)

OTHER PUBLICATIONS

International Search Report and Written Opinion of the International Searching Authority, PCT/US2017/063087, dated Mar. 7, 2018.

*Primary Examiner* — William R Alexander
*Assistant Examiner* — Sharrief I Broome
(74) *Attorney, Agent, or Firm* — Womble Bond Dickinson (US) LLP

(57) ABSTRACT

A method of controlling tint for a plurality of electrochromic devices, performed by a control system, is provided. The method includes receiving a request to change tint level of a plurality of electrochromic devices, and consulting transfer functions for tint level relative to drive for each of the plurality of electrochromic devices, wherein at least one of the plurality of electrochromic devices has a transfer function differing from at least one other of the plurality of electrochromic devices. The method includes driving each of the plurality of electrochromic devices in accordance with
(Continued)

the transfer functions, so as to coordinate tint level or rate of change of tint level across the plurality of electrochromic devices.

20 Claims, 10 Drawing Sheets

(52) U.S. Cl.
CPC .............. *E06B 2009/2417* (2013.01); *E06B 2009/2464* (2013.01); *G02F 2203/01* (2013.01); *G05B 2219/2642* (2013.01)

(58) Field of Classification Search
CPC .............. G02F 1/161; G02F 1/1523; G02F 2001/1555; G02F 2001/15145; G02F 1/15165; G02F 1/1525; G02F 2001/1536; G02F 1/13439; G02F 1/1503; G02F 2001/164; G02F 1/13318; G02F 1/133512; G02F 2201/44; G02F 1/0018; E06B 2009/2464; E06B 9/24; E06B 3/6722; E06B 7/28; E06B 2009/2405; E06B 2009/2417; E06B 3/66314; E06B 2009/2643; E06B 3/66352; E06B 2003/6638; E06B 2003/66385; E06B 2009/2411; E06B 2009/2476; E06B 3/66; E06B 3/6612; E06B 3/66328; E06B 3/66342; E06B 3/67; E06B 3/6715; E06B 3/67326; B32B 17/10036; B32B 17/10513; B32B 17/10761; B32B 17/1077; B32B 17/10788; B32B 2551/00; B32B 37/06; B32B 17/06; B32B 17/10495; B32B 37/16; B32B 17/068; B32B 17/10045; B32B 17/10128; B32B 17/10174; B32B 17/10183; B32B 17/10201; B32B 17/10477; B32B 17/10532; B32B 17/10678; G02B 27/0101; G02B 27/58; G02B 2027/0118; G02B 26/02; G02B 5/23; G02B 2027/0178; G02B 26/005; G02B 27/0172; G02B 30/27; G02B 5/201; G02B 5/205; G02B 1/11; G02B 1/14; G02B 2027/0132; G02B 2027/0138; G02B 2027/014; G02B 2027/0141; G02B 2027/0156; G02B 25/001
See application file for complete search history.

(56) References Cited

U.S. PATENT DOCUMENTS

| | | | |
|---|---|---|---|
| 2007/0002006 A1 | 1/2007 | Edwards | |
| 2007/0113051 A1* | 5/2007 | Salpakari | G06F 9/4488 712/210 |
| 2015/0002919 A1* | 1/2015 | Jack | G09G 3/19 359/275 |
| 2015/0060648 A1* | 3/2015 | Brown | G02F 1/13318 250/208.2 |

FOREIGN PATENT DOCUMENTS

| | | | | |
|---|---|---|---|---|
| WO | 2016094445 A1 | 6/2016 | | |
| WO | WO-2016094445 A1 * | 6/2016 | ............ | G05B 15/02 |

* cited by examiner

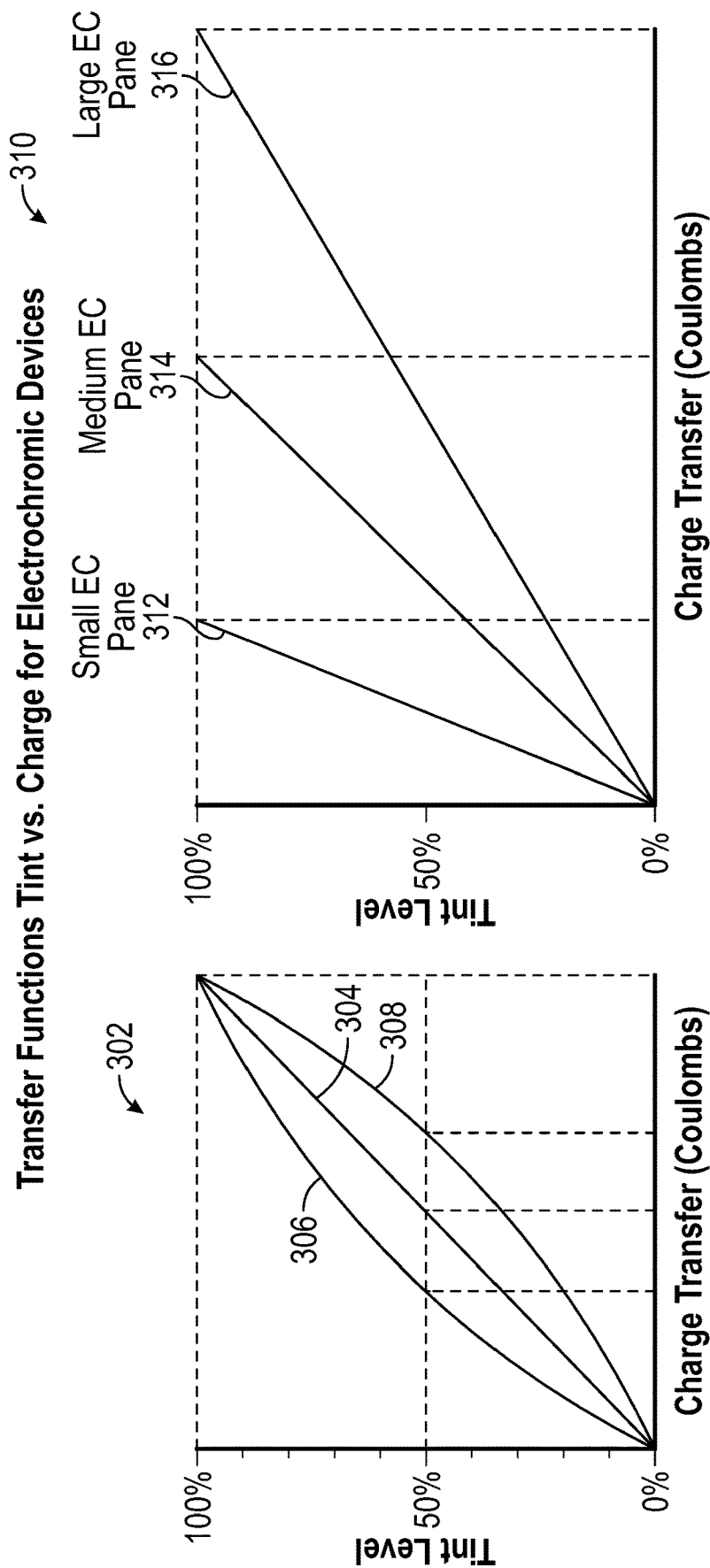

ELECTROCHROMIC PANEL TRANSMISSION LEVEL SYNCHRONIZATION

BACKGROUND

If multiple electrochromic panels are next to or near each other, a user may want them to always have the same tint level while static or in transition. Yet, panels of different sizes, electrochromic chemistry, or age (vintage) likely have different tint responses even when driven identically. They may change tint or transmissivity at different rates, or end up at a different tint level when driving stops. It is also desired to coordinate patterns of tint or transmissivity on multiple electrochromic devices, e.g., on fronts or sides of large buildings. Therefore, there is a need in the art for a solution which overcomes the drawbacks described above.

SUMMARY

In some embodiments, a method of controlling tint for a plurality of electrochromic devices, performed by a control system, is provided. The method includes receiving a request to change tint level of a plurality of electrochromic devices, and consulting transfer functions for tint level relative to drive for each of the plurality of electrochromic devices, wherein at least one of the plurality of electrochromic devices has a transfer function differing from at least one other of the plurality of electrochromic devices. The method includes driving each of the plurality of electrochromic devices in accordance with the transfer functions, so as to coordinate tint level or rate of change of tint level across the plurality of electrochromic devices.

In some embodiments, a controller with transmission level synchronization for electrochromic devices is provided. The controller includes a memory, configurable to hold a plurality of transfer functions for tint level relative to drive of electrochromic devices, and one or more processors configurable to couple to at least a first electrochromic device and a second electrochromic device and to perform a method. The method includes consulting a first transfer function for the first electrochromic device, and a second transfer function for the second electrochromic device, and driving the first electrochromic device in accordance with the first transfer function, and the second electrochromic device in accordance with the second transfer function, to coordinate tint level or rate of change of tint level of the first electrochromic device and tint level or rate of change of tint level of the second electronic device.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3A depicts transfer functions of tint versus charge for various electrochromic devices.

FIG. 3B depicts transfer functions of tint versus charge for various sizes of electrochromic devices.

DETAILED DESCRIPTION

Figure 1A:
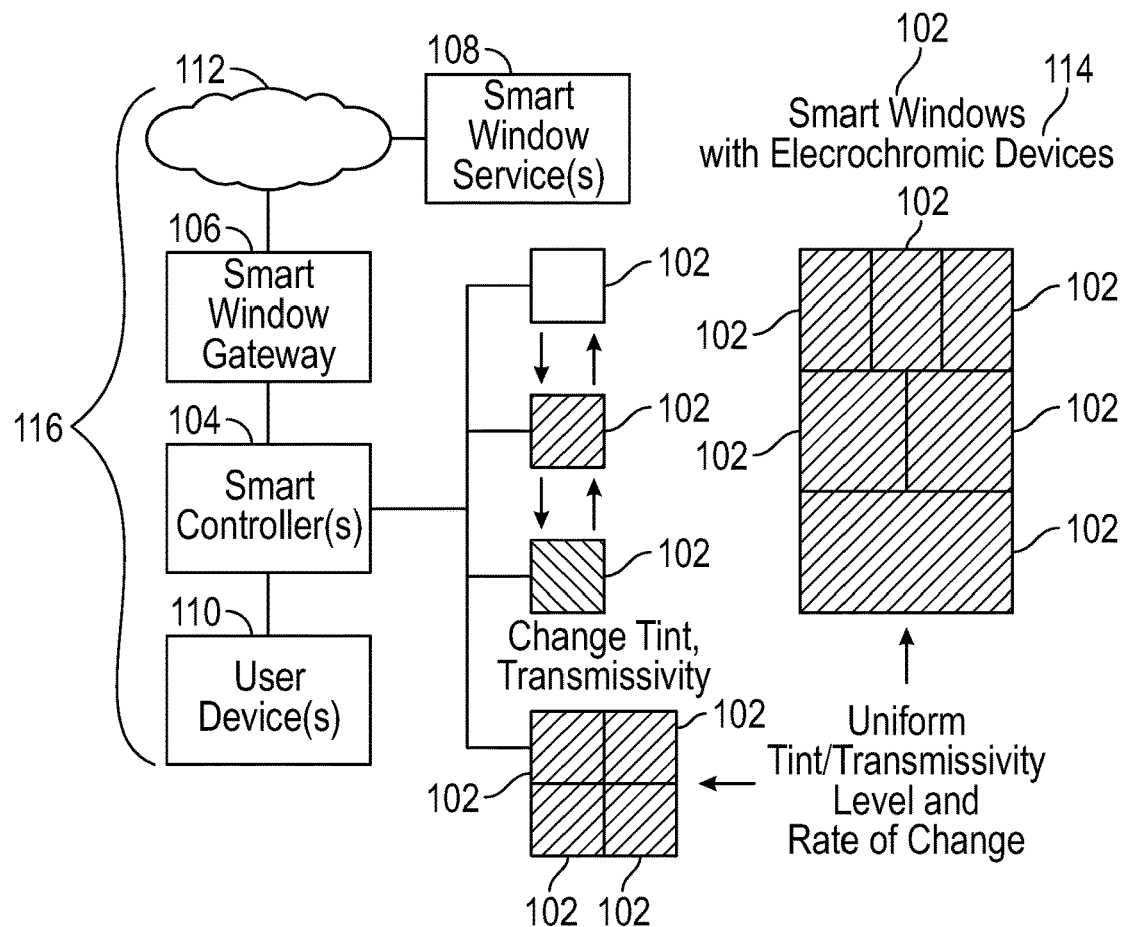
FIG. 1A is a system diagram showing a distributed device network controlling smart windows with electrochromic devices to varying levels of tint or transmissivity, and uniform levels and rates of change of tint or transmissivity.

FIG. 1A is a system diagram showing a distributed device network 112 controlling smart windows 102 with electrochromic devices 114 to varying levels of tint or transmissivity, and uniform levels and rates of change of tint or transmissivity. Smart windows 102 may be more than one smart window, for example a window wall or multipane electrochromic window. The electrochromic devices 114 may be electrochromic devices having a gradient transparent conductive layer that allows for uniform tint or transmissivity of the electrochromic device across the entire device, eliminating the "iris effect" of electrochromic devices that do not have such a gradient conductive layer, as described U.S. Pat. No. 8,717,658 that is incorporated herein by reference. The iris effect is where electrochromic windows tint or change transmissivity from the outside inwards causing what appears to be an iris closing slowly to the center of the device. Embodiments of the invention described herein are particularly well suited for electrochromic devices having the gradient transparent conductive layer or layers because the varying of the levels of tint or transmissivity at uniform levels and rates of change can occur within the individual electrochromic devices and across more than one smart windows 102. This provides optimal benefits from electrochromic windows because the tinting and shading properties of each of the windows in a group will be uniform within each of the windows. Therefore a group or pair of electrochromic smart windows 102 will appear to vary or change as one without any iris effect within each of the individual electrochromic devices 114. Control of the electrochromic devices 114 is distributed throughout the smart windows 102, smart controllers 100 for, smart window gateway 106, smart window services 108 (e.g. cloud services available through the Internet or other network 116, or other network-available service) and user devices, i.e., the distributed device network 112, in various combinations and in various embodiments. Each electrochromic device 114 is controllable for tint or transmissivity, by driving charge into or out of the electrochromic device 114 as directed by the distributed device network 112. The smart windows 102 may have drivers having the electrical structure and drive methods as described in U.S. Pat. No. 9,563,097 that is incorporated herein by reference. The driver described in U.S. Pat. No. 9,563,097 includes a sense voltage that allows the driver and thus the distributed device network 112 to monitor the voltage and current of the electrochromic devices in real time. Embodiments of this invention may be particularly well suited to drivers of electrochromic devices 104 having such a sense voltage and ability to determine the voltage and current in real time of the electrochromic devices 104 to achieve uniform levels and rates of change of tint or transmissivity within a group or pair of smart windows 102. It is desired to drive multiple electrochromic devices 114 to a uniform tint or transmissivity level, and at a uniform rate of change of tint or transmissivity, for reasons such as aesthetics, energy efficiency, or optimal performance of groups of windows. Yet, different size electrochromic devices 114, or electrochromic devices 114 with different age or electrochromic chemistry, respond differently when driven identically. Various embodiments of the smart window system adjust the control of each of the various smart windows 102 and associated electrochromic devices 114 so as to achieve this uniform tint or transmissivity level or uniform rate of change of tinting or transmissivity, when such is desired. One mechanism for doing so is use of transfer functions as further described below.

Figure 1B:
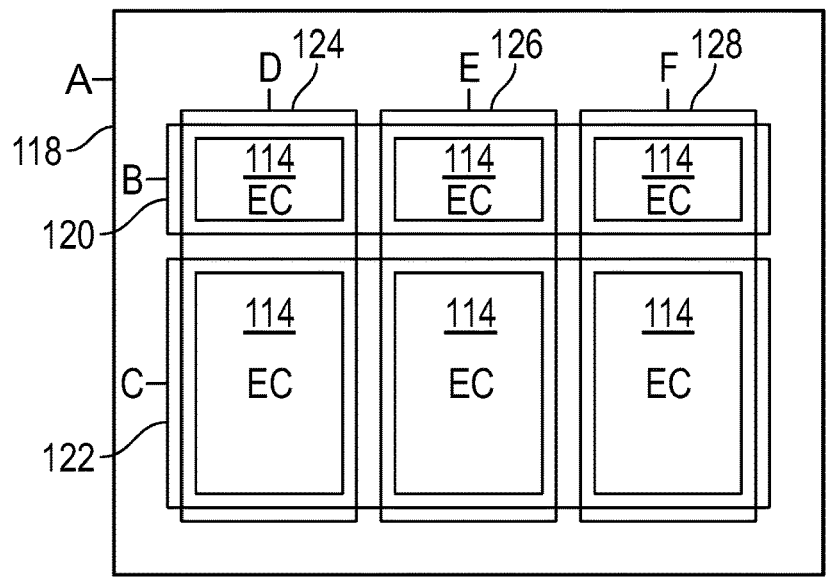
FIG. 1B depicts an example of smart window logical groups that can be controlled in the system shown in FIG. 1A and variations thereof.

FIG. 1B depicts an example of smart window logical groups that can be controlled in the system shown in FIG. 1A and variations thereof. In various embodiments, a smart window 102 can have one electrochromic device 114, or two or more electrochromic devices 114, for example as multiple panes of a window. The smart window system can select and control various groups of electrochromic devices 114, whether on the same smart window 102 or differing smart windows 102. One logical group 118, denoted group A, is all of the electrochromic devices 114 in FIG. 1B. Such a group would be useful to select all of the smart windows 102 of a wall, a room, a side of a building, a floor of a building, etc. Two more logical groups 120, 122 categorize electrochromic devices 114 by size, or by upper and lower placement, for example. Logical group 120 denoted group B could include the smaller sized electrochromic devices 114, or the upper electrochromic devices 114 in an arrangement, and logical group 120 denoted group C could include the larger sized electrochromic devices 114, or the lower electrochromic devices 114 in the arrangement. This grouping is useful to tint upper electrochromic devices 114 when the sun is higher in the sky, independently of how the lower electrochromic devices 114 are tinted, for example. Logical groups 124, 126, 128 denoted group D, group E and group F could each group an upper electrochromic device 114 and a lower electrochromic device 114 as a pair to be controlled together. With that grouping, pairs (or larger numbers) of electrochromic devices 114 could be treated as equivalent to a single, larger or compound electrochromic device 114 and tinted together. Alternatively, the electrochromic devices 114 in a multi-pane smart window are grouped together. Further such combinations and logical groups are readily devised. Many combinations could have different sized electrochromic devices 114 in a group, or electrochromic devices 114 with differing chemistry, fabrication, or other characteristics.

Figure 2:
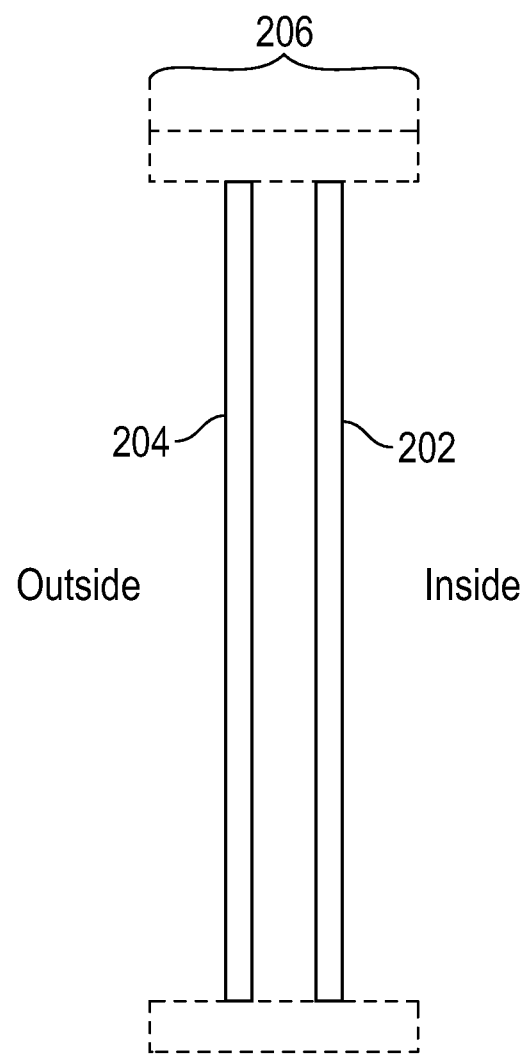
FIG. 2 is a cross-section view of a double pane electrochromic device.

FIG. 2 is a cross-section view of a double pane electrochromic device 206. Under certain circumstances, it may be desirable to tint the outside pane 204, the inside pane 202, or both panes 202, 204, for an individual smart window 102, or as part of a group of smart windows 102. For example, tinting the outside pane 204 causes ultraviolet and infrared light to be absorbed and re-radiated as infrared from that outside pane 204, keeping the interior of a building cooler or less heated by sunlight, and may be preferable in summer. Tinting the inside pane 202 causes the ultraviolet and infrared light to be absorbed and re-radiated as infrared from that inside pane 202, where some of this reradiated energy is trapped as heat inside the double pane electrochromic device 206, e.g., in nitrogen or other gas trapped between the outside and inside panes 204, 202, and some of this is reradiated to the interior of the building as may be preferable in winter.

FIG. 3A depicts transfer functions of tint versus charge for various electrochromic devices. The graph 302 depicts a family of transfer function curves 304, 306, 308 that are possible for electrochromic devices 114. The perhaps ideal case is a linear, straight-line transfer function 304, in which the tint level is directly proportional to the total amount of charge transferred into the electrochromic device 114. Above the straight-line transfer function 304 is an upward facing convex transfer function 306, for another electrochromic device 114, in which relatively less total charge transfer gives relatively greater tint. Below the straight-line transfer function 304 is an upward facing concave transfer function 308, for yet another electrochromic device 114, in which relatively more total charge transfer gives relatively less tint, in comparison to the straight-line transfer function 304. Other shapes for transfer functions are possible.

FIG. 3B depicts transfer functions of tint versus charge for various sizes of electrochromic devices 114. The graph 310 depicts a family of transfer function curves 312, 314, 316 of tint versus charge that are possible for different size electrochromic devices 114. The small electrochromic pane achieves a given tint level, up to 100%, for a total charge transfer of less than that for the medium size electrochromic pane, which in turn achieves that same tint level for a total charge transfer of less than that for the large size electrochromic pane. Each of these transfer functions 312, 314, 316 could have straight-line, convex or concave shape, or other shape as discussed above.

Figure 4A:
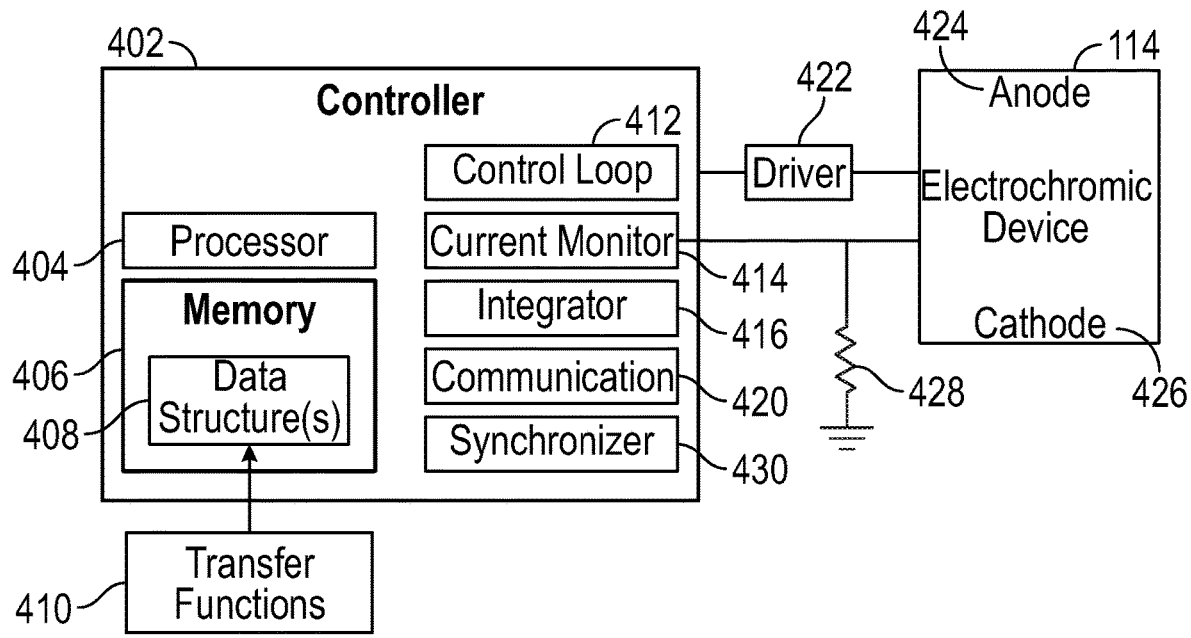
FIG. 4A is an embodiment of a controller that monitors and integrates current to determine charge transfer into and out of an electrochromic device, and communicates with other controllers to coordinate tint or transmissivity levels of the electrochromic devices in accordance with transfer functions for the electrochromic devices.

FIG. 4A is an embodiment of a controller 402 that monitors and integrates current to determine charge transfer into and out of an electrochromic device 114, and communicates with other controllers 402, using a communication module 420, to coordinate tint or transmissivity levels of the electrochromic devices 114 in accordance with transfer functions 304, 306, 308, 312, 314, 316 for the electrochromic devices 114. To drive multiple smart windows 102 to uniform tint or transmissivity levels, multiple controllers 402 communicate amongst themselves, and perform control functions in a control loop 412, as discussed below, to drive each of the electrochromic devices 114. In some embodiments, a single controller 402 coordinates with one or more drivers 422 as shown in FIGS. 4B-4D.

In one embodiment, the controllers 402 consult transfer functions 410 (e.g., 304, 306, 308, 312, 314, 316), which could be in the form of data structures 408 in memory 406. These and other functions can be performed by a synchronizer 430 in the controller 402, which synchronizes tint or transmissivity levels for multiple electrochromic devices 114. The transfer functions 410 could be obtained from the smart window services 108, preloaded into memory 406 during manufacture of the controllers 402, or determined empirically through installer or user feedback, etc. For example, if the controllers 402 are directing the electrochromic windows to 25% tint level, the controllers 402 determine the amount of charge according to each of the charge transfer functions 410 for the respective windows to be tinted. Then the controllers 402 drive the electrochromic windows, using a driver 422, monitoring the current to or from each electrochromic window, using a current monitor 414, integrating the current, using an integrator 416, and determining the amount of charge transferred. For example, in one embodiment, the driver 422 drives the anode 424 of the electrochromic device 114, and the current monitor 414 monitors voltage across a sense resistor 428 attached to the cathode 426 of the electrochromic device 114, although other mechanisms for driving electrochromic devices and monitoring current are readily devised. When the total amount of charge transferred for a specific window equals the determined amount of charge for the requested tint level, the controller 402 stops driving current into or out of the electrochromic window. This achieves uniform tint or transmissivity level for the electrochromic windows that are selected for the tinting operation, but does not necessarily achieve uniform rate of change of tint or transmissivity level (e.g., unless the electrochromic windows are all of uniform size, chemistry and age).

To achieve uniform rate of change of tint or transmissivity level, in one embodiment the controllers 402 adjust the level of current (and therefore the rate of charge transfer) driven into or out of each of the electrochromic devices 114 so that the rate of change of transmissivity according to the transfer functions 410 of each of the electrochromic devices 114 matches.

Figure 4B:
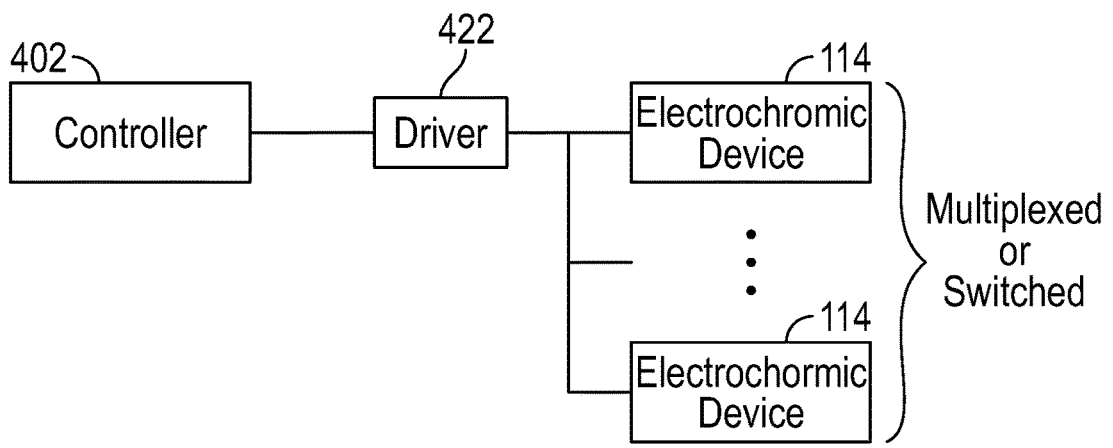
FIG. 4B depicts a variation of the controller of FIG. 4A with a driver that has multiplexed or switched control of multiple electrochromic devices.
Figure 4C:
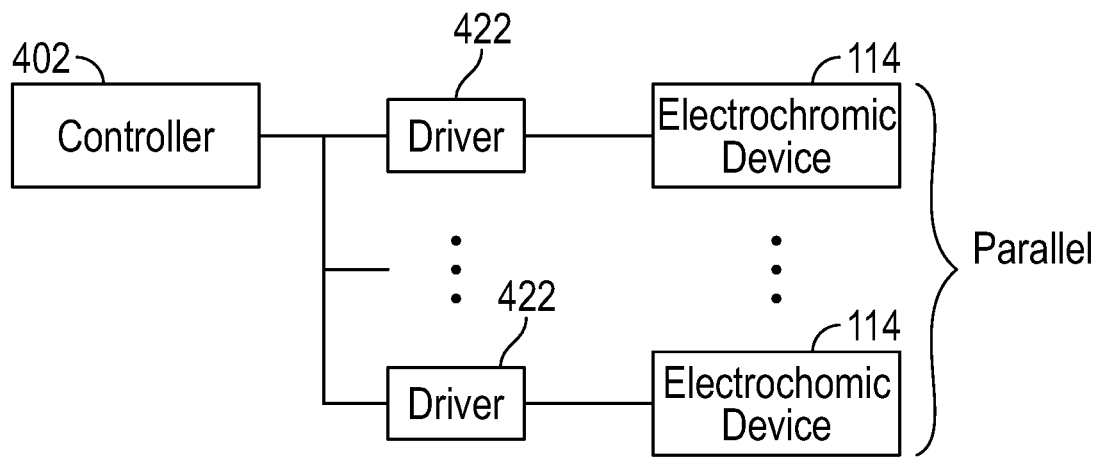
FIG. 4C depicts a further variation of the controller of FIG. 4A with multiple drivers for parallel control of multiple electrochromic devices.
Figure 4D:
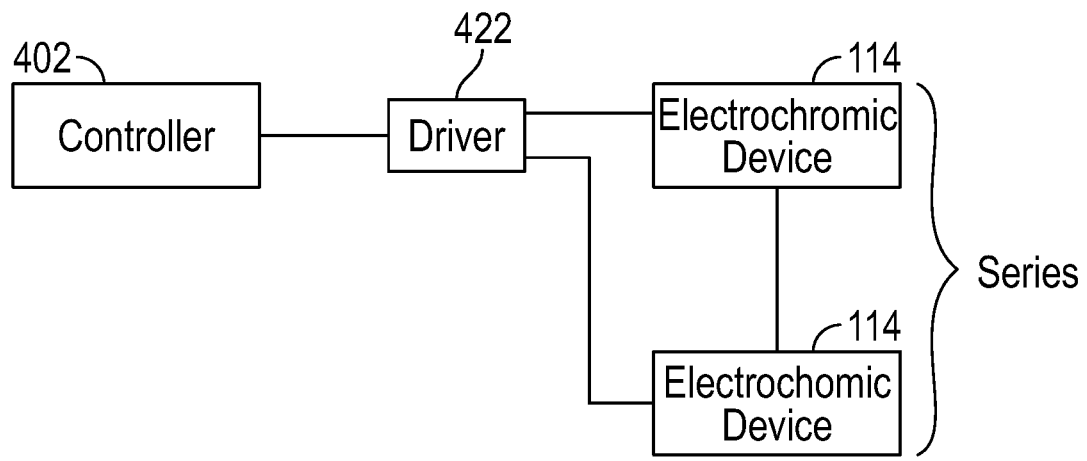
FIG. 4D depicts a further variation of the controller of FIG. 4A with a driver that controls series-connected electrochromic devices.

FIG. 4B depicts a variation of the controller 402 of FIG. 4A with a driver 422 that has multiplexed or switched control of multiple electrochromic devices 114. This embodiment allows one controller 402 and one driver 422 to control multiple electrochromic devices 114, by multiplexing or switching control from the driver 422 to each of the electrochromic devices 114. For example, the driver 422 could have a multiplexer or a switch, and timeshare control to electrochromic devices 114 in a sequence, to control one at a time, or two or more at closely spaced times to mimic control at the same time.

FIG. 4C depicts a further variation of the controller 402 of FIG. 4A with multiple drivers 422 for parallel control of multiple electrochromic devices 114. This embodiment allows one controller 402 and multiple drivers 422 to control the electrochromic devices 114, with one driver 422 for each electrochromic device 114. The controller 422 could instruct each driver 422 to control a corresponding electrochromic device 114 independently of other drivers 422 and electrochromic devices 114, or could issue instructions to groups of drivers 422 and corresponding electrochromic devices 114.

FIG. 4D depicts a further variation of the controller 402 of FIG. 4A with a driver 422 that controls series-connected electrochromic devices 114. With this arrangement, the electrochromic devices 114 connected in series receive the same, or a shared, control from the driver 422 but are not controlled individually or independently. For example, it could be less expensive or easier to manufacture two or more electrochromic devices 114 attached to a single glass pane as a substrate and control these electrochromic devices 114 as if they were a single, monolithic electrochromic device, than to manufacture a single, larger electrochromic device 114.

Figure 5A:
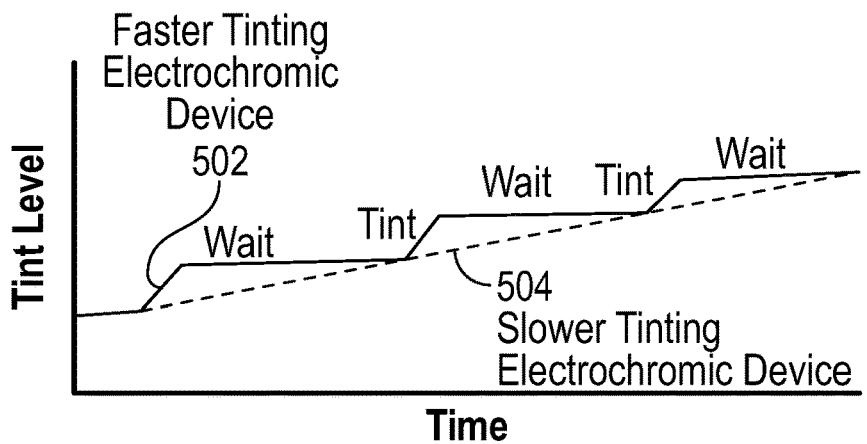
FIG. 5A depicts a faster tinting electrochromic device tinting and waiting until a slower tinting electrochromic device achieves a specific tinting level.

FIG. 5A depicts a faster tinting electrochromic device 502 tinting and waiting until a slower tinting electrochromic device 504 achieves a specific tinting level. In one embodiment, to achieve uniform rate of change of tint or transmissivity level, the controllers 402 communicate amongst themselves and determine which of the electrochromic devices 114 is switching most slowly. Tinting at each of the electrochromic devices 114 that is switching more rapidly (i.e., tinting at a faster rate) than the slowest (i.e., tinting at a slower rate) one(s) is stopped, for example at a predetermined tint level, until the most slowly switching electrochromic device 114 attains (i.e., catches up to) that predetermined tint level. Then, tinting of all of the electrochromic devices 114 resumes, and this process is repeated at the next predetermined tint level. This proceeds iteratively until the desired final level of uniform tint or transmissivity is achieved, as shown at the right end of the graph in FIG. 5A. Step size could be adjusted, with finer step size giving a more continuously appearing rate of change to the tint or transmissivity.

One embodiment applies leaderless coordination among the smart windows 102. The group of drivers and controllers 402 coordinate amongst themselves while tinting, and do not rely on a gateway, cloud or designated leader to do the coordination. The group adapts to however many drivers and controllers 402 are present and communicating in the group. Analogous to a flock of birds or crowd of people going to a destination that will slow themselves down for the slowest bird in the flock or person in the crowd, the group does not have to have a designated leader, and all know the common destination and arrive together.

The above mechanisms and processes can be applied to groups of electrochromic devices 114 to make patterns switch levels of tint at a uniform rate and/or to a uniform level. These can also be applied to outside 204 and inside 202 panes as depicted in FIG. 2. The controller 402 shown in FIGS. 4A-4D can be implemented in any of the control devices shown in FIG. 1A, or distributed throughout the distributed device network 112, in various embodiments. Some embodiments adjust rate of change of tinting, and associated levels of current and charge transfer, to achieve more uniform tinting in a specific electrochromic device 114 where most rapid tinting has a tendency to show tinting artifacts (e.g., around electrodes or bus bars).

Figure 5B:
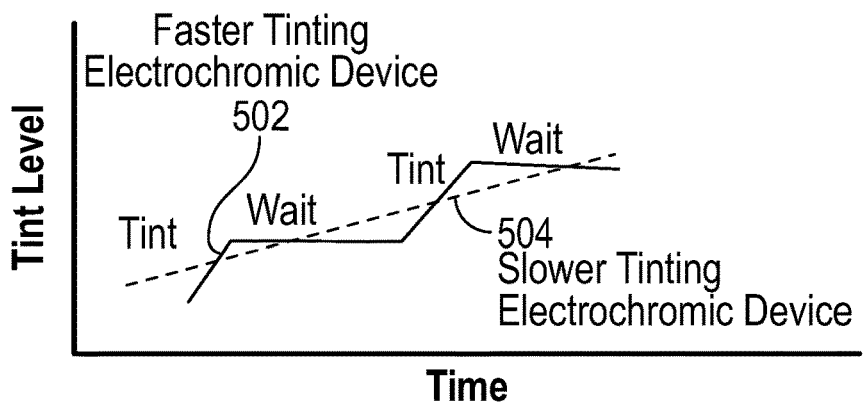
FIG. 5B depicts the faster tinting electrochromic device tinting and waiting to remain within a tint range of the tint level of the slower tinting electrochromic device.

FIG. 5B depicts the faster tinting electrochromic device 502 tinting and waiting to remain within a tint range of the tint level of the slower tinting electrochromic device 504. In this variation of the scenario of FIG. 5A, the tinting at each of the electrochromic devices 114 that is switching more rapidly than the slower one(s) is stopped until the tinting of the slower tinting electrochromic device 504 overtakes the stopped tinting level. When another threshold is reached by the slower tinting electrochromic device 504, tinting of the faster tinting electrochromic device(s) 502 resumes. By alternately tinting and waiting, the tint level of the faster tinting electrochromic device(s) 502 can be kept close to the tint level of the slower tinting electrochromic device(s) 504, for example within a specified range. Thresholds, ranges, duty cycles, symmetric or asymmetric deviations, etc. in various combinations, could be adjustable.

Figure 5C:
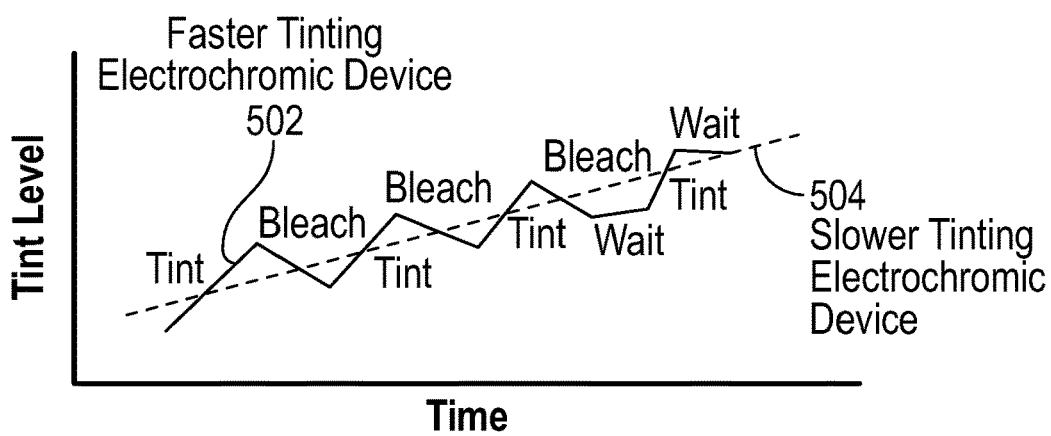
FIG. 5C depicts the faster tinting electrochromic device tinting, bleaching and waiting, in various combinations, to remain within a tint range of the tint level of the slower tinting electrochromic device.

FIG. 5C depicts the faster tinting electrochromic device tinting, bleaching and waiting, in various combinations, to remain within a tint range of the tint level of the slower tinting electrochromic device. In this variation of the scenarios of FIGS. 5A and 5B, the control of the faster tinting electrochromic device 502 alternately tints and bleaches, backtracking and touching or crisscrossing over the tint level of the slower tinting electrochromic device 504, optionally waiting as in the scenario depicted in FIG. 5B.

Figure 7:
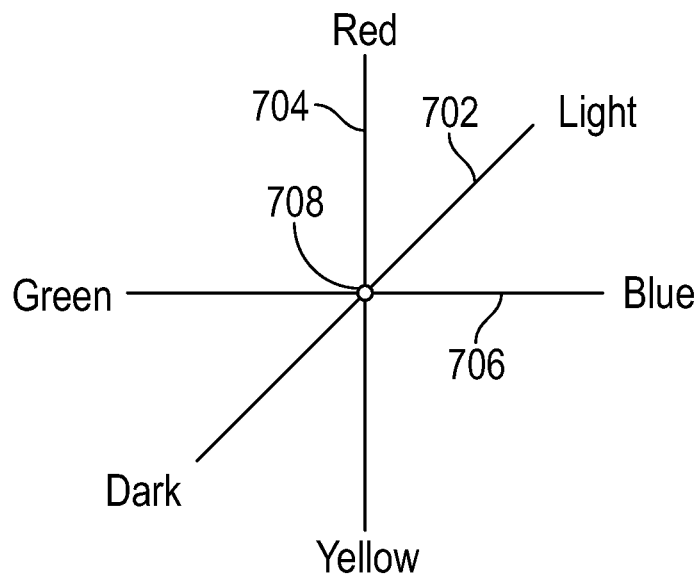
FIG. 7 depicts a multiaxis space for representing tint levels that have levels of color hues at various levels of transmissivity.
Figure 8:
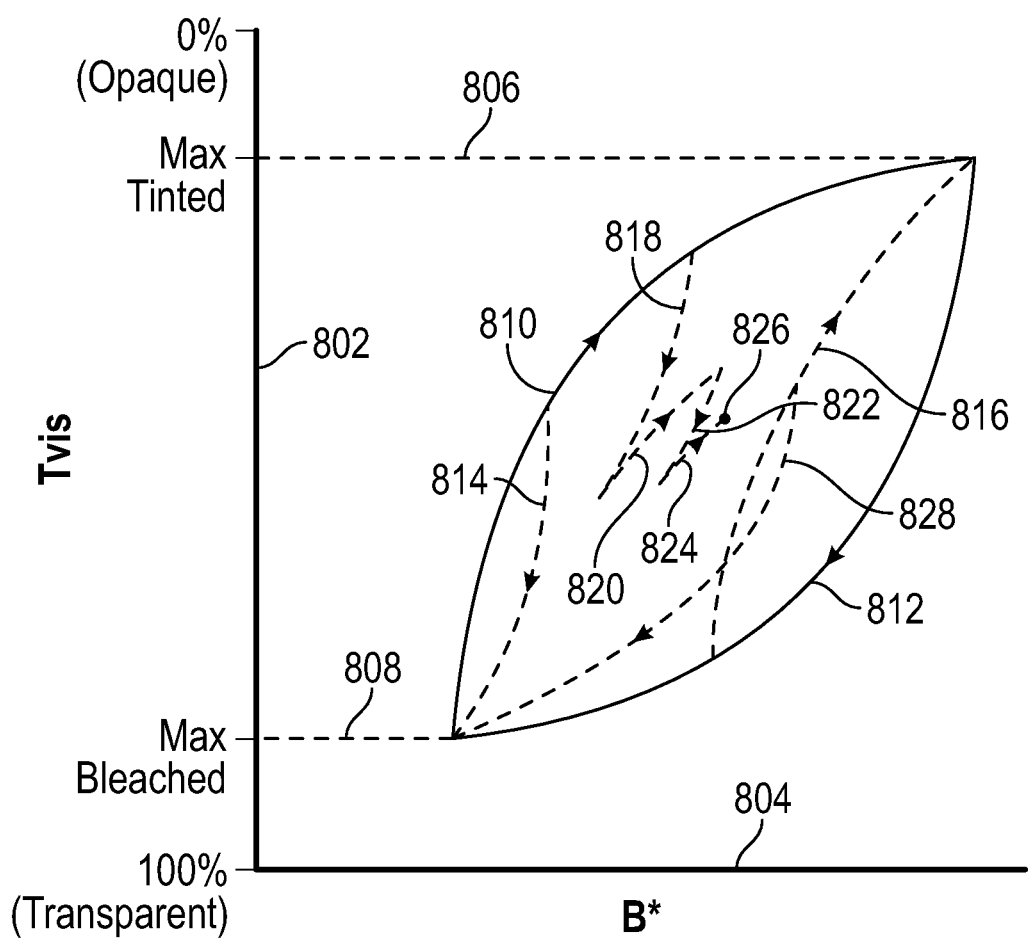
FIG. 8 is a two axis graph of visible light transmissivity, denoted as Tvis, versus color hue of one of the color axes of FIG. 7, denoted as B*, showing various paths for changing tint level of an electrochromic device.

It should be appreciated that all of the scenarios depicted and FIGS. 5A-5C can be readily developed for increasing tint level or decreasing tint level, and for tint levels that are initially far apart or close together. Further variations, including for embodiments of electrochromic devices that have color hues as shown in FIGS. 7 and 8, are readily developed in keeping with the teachings herein.

Figure 6:
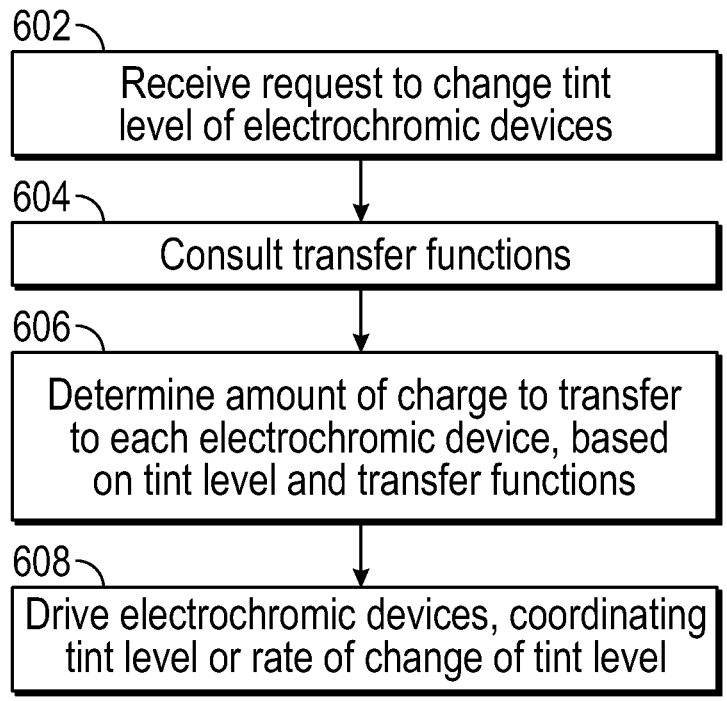
FIG. 6 is a flow diagram of a method of controlling transmissivity of multiple electrochromic devices, which can be practiced by embodiments of the controller and the distributed device network as shown in FIGS. 1A-5C, 8 and 9.

FIG. 6 is a flow diagram of a method of controlling transmissivity of multiple electrochromic devices, which can be practiced by embodiments of the controller and the distributed device network as shown in FIGS. 1A-5C, 8 and 9. The method can be practiced by one or more processors, such as processors in controllers and components in the distributed device network. In an action 602, a request to change tint level of electrochromic devices is received. The request could be received from a user, through a user device, or could be received from one or more components of the distributed device network making a decision under various circumstances.

In an action 604, transfer functions are consulted. The transfer functions are of tint level of an electrochromic device versus drive, for example charge transfer into or out of an electrochromic device. In various embodiments, the transfer functions are downloaded from a smart window service, are resident in memory in a controller, or are determined based on user feedback.

In an action 606, an amount of charge to transfer to each electrochromic device is determined, based on tint level and the transfer functions. For example, for a specific tint level and electrochromic device, the relevant transfer function shows the amount of charge to transfer to the electrochromic device. In an action 608, the electrochromic devices are driven, coordinating tint level or rate of change of tint level across the electrochromic devices. The controller drives the determined amount of charge, for each of the electrochromic devices, and in some embodiments controls the rate at which that charge is delivered (i.e., the current to or from the electrochromic device) and/or stops and starts driving a particular electrochromic device while comparing tint levels of electrochromic devices, based on the transfer functions and tracking charge transfer. In variations of the method, patterns are formed by controlling tinting of groups of electrochromic devices at a uniform rate or to a uniform level.

FIG. 7 depicts a multi-axis space for representing tint levels that have levels of color hues at various levels of transmissivity. One axis 702, e.g. the z-axis perpendicular to the page in this depiction, is designated for tint levels from dark to light, i.e. high tint, low transmissivity or high opacity, to low tint, high bleach, high transmissivity or low opacity. A second axis 706, e.g., the x-axis in this depiction, is designated for tint levels from green to blue (or could be other colors). A third axis 704, e.g., the y-axis in this depiction, is designated for tint levels from yellow to red (or could be other colors). Tint levels, curves, families of curves or a space-filling geometry of tint levels can be represented in this multiaxis space, and from this representation two axis versions of these curves can be projected as depicted in FIG. 8. Generally, a curve, family of curves, or a filled geometry represented in the multiaxis space will be implementation specific to a given electrochromic device 114, and others may or may not share the same geometry.

FIG. 8 is a two axis graph of visible light transmissivity, denoted as Tvis, versus color hue of one of the color axes of FIG. 7, denoted as B*, showing various paths for changing tint level of an electrochromic device 114. The vertical axis, Tvis, has 100% visible light transmissivity at the bottom as a theoretical maximum transparent value, and 0% visible light transmissivity at the top as a theoretical maximum opaque value. Most, if not all, practical electrochromic devices 114 will have a maximum tinted value 806 that is less than 0% visible light transmissivity or lower on the vertical axis than the top, and a maximum bleached value 808 that is less than 100% transparent, or higher up on the vertical axis than the bottom. The horizontal axis, B*, has endpoints of one of the color hue axes of the FIG. 7 or variations thereof, for example green to blue or yellow to red, or vice versa, or some other colors. Boundaries and interior of the geometry displayed on the two axis graph of FIG. 8 include possible levels of visible light transmissivity and color hue for a specific electrochromic device 114. The boundaries show paths 810, 812 for tinting and bleaching the electrochromic device 114 between the two maxima (i.e., maximum bleached value 808 and maximum tinted value 806). These paths 810, 812 are nonlinear and have hysteresis. That is, tinting the electrochromic device 114, from the maximum bleached value 808 produces one set of values of visible transmissivity and color hue along the tinting path 810. Bleaching the electrochromic device 114, from the maximum tinted value 806, produces another set of values of visible transmissivity and color hue along the bleaching path 812, and these values differ between the two paths 810, 812. Arrows along these paths 810, 812 and other example paths 814, 816, 818, 820, 822, 824 show the direction of travel for tinting or bleaching operations on the electrochromic device 114. So, for example, from a point along the tinting path 810 from the maximum bleached value 808, a bleaching path 814 deviates from the tinting path 810 and produces another set of visible transmissivity and color hue values. And, from a point along the bleaching path 812 from the maximum tinted value 806, a tinting path 816 produces yet another set of visible transmissivity and color hue values.

Of relevance to the alternating tinting and bleaching depicted in FIG. 5C, a variation of that scenario can be followed to alternately bleach and tint (or vice versa) an electrochromic device 114 and attain a specified visible transmissivity value and color hue value at a point 826 in some embodiments. In this example, from the tinting path 810 from the maximum bleached value 808, a bleaching path 818, a tinting path 820, a bleaching path 822, and a tinting path 824 arrive at the intended, desired or specified transmissivity value and color hue value 826. Many other possible tinting and bleaching paths, optionally with waiting, could arrive at this point 826, or any other desired or specified transmissivity value and color hue value point that is within the boundaries of the bleaching path 812 from the maximum tinted value 806 to the maximum bleached value 808 and the tinting path 810 from the maximum bleached value 808 to the maximum tinted value 806. A color hue value could be reached at multiple values of visible light transmissivity, as would be represented by a vertical line segment in the graph of FIG. 8. Various embodiments of the smart window system perform matching or synchronization of visible light transmissivity, color hue, or both, across various electrochromic devices 114 when switching, as further described in the method in FIG. 10. Information about visible light transmissivity and color hue relative to tinting and bleaching, is readily represented in transfer functions relating to charge transfer such as shown in FIGS. 3A and 3B and embodied in transfer functions 410 in FIG. 4A. This information, in various forms, is employed for matching or coordinating color hue as well as visible light transmissivity of multiple electrochromic devices 114 when the smart window system tints or bleaches electrochromic devices 114.

Figure 9:
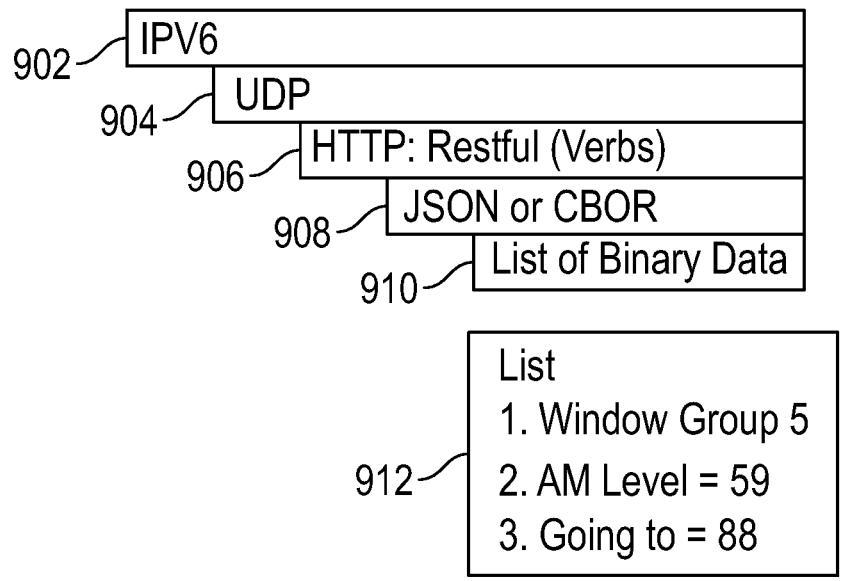
FIG. 9 depicts communication among smart window components, using a network protocol.

FIG. 9 depicts communication among smart window components, using a network protocol. Referring back to FIGS. 1A and 4A-4D, various embodiments of the smart window system have various communications among smart windows 102, smart controllers 104, the smart window gateway 106, user devices 110 and smart window services 108, and these communications could have various formats and protocols. The example in FIG. 9 is one embodiment for communication, and variations and other embodiments are readily devised in keeping with the teachings herein. In this example, the communication is through IPv6 (Internet protocol, version 6) 902, UDP (user datagram protocol) 904 messages called datagrams. The messages use HTTP (hypertext terminal protocol) RESTful (representational state transfer) 906 compliant web services to express verbs, such as get, put, patch, post, delete. Data is sent in a format such as JSON (JavaScript object notation) or CBOR (concise binary object representation), and can include a list 910 of binary data. One example of a list 910 is the list 912, which communicates 1. WINDOW GROUP 5 (e.g., the smart window 102 is in logical group number 5), 2. AM LEVEL=59 (e.g., the smart window 102 is at tint level 59), 3. GOING TO=88 (e.g., the smart window 102 is transitioning to tint level 88). Other information, formats, protocols and communication mechanisms are readily devised in keeping with the teachings herein.

Figure 10:
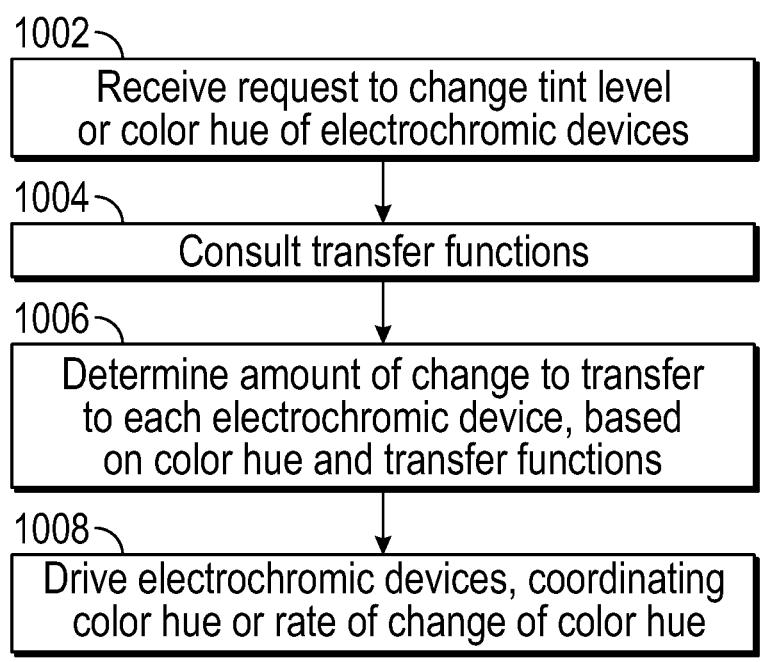
FIG. 10 is a flow diagram of a method of controlling color hue of multiple electrochromic devices, which can be practiced by embodiments of the controller and the distributed device network as shown in FIGS. 1A-5C, 8 and 9.

FIG. 10 is a flow diagram of a method of controlling color hue of multiple electrochromic devices, which can be practiced by embodiments of the controller and the distributed device network as shown in FIGS. 1A-5C, 8 and 9. The method can be practiced by one or more processors, such as processors in controllers and components in the distributed device network. By controlling color hue, the method also controls tint or transmissivity of electrochromic devices. In an action 1002, a request to change tint level or color hue of electrochromic devices is received. The request could be received from a user, through the user device, or could be received from one or more components of the distributed device network making a decision under various circumstances.

In an action 1004, transfer functions are consulted. The transfer functions are of color hue of an electrochromic device versus drive, for example charge transfer into or out of an electrochromic device in some embodiments. These transfer functions could be combined with transfer functions for tint level, in some embodiments. In various embodiments, the transfer functions are downloaded from a smart window service, are resident in memory in a controller, or are determined based on user feedback.

In an action 1006 of FIG. 10, an amount of charge to transfer to each electrochromic device is determined, based on color hue level and the transfer functions. For example, for a specific color hue and electrochromic device, the relevant transfer function shows the amount of charge to transfer to the electrochromic device. In an action 608, the electrochromic devices are driven, coordinating color hue or rate of change of color hue across the electrochromic devices. The controller drives the determined amount of charge, for each of the electrochromic devices, and in some embodiments controls the rate at which that charge is delivered (i.e., the current to or from the electrochromic device) and/or stops and starts driving a particular electrochromic device while comparing color hue levels of electrochromic devices, based on the transfer functions and tracking charge transfer. In variations of the method, patterns are formed by controlling color hue of groups of electrochromic devices at a uniform rate or to a uniform level. A desired color hue is matched or attained by following a direct path or combination of paths of alternating bleaching and tinting such as shown in FIGS. 5C and 8, optionally with waiting, in various embodiments.

Figure 11:
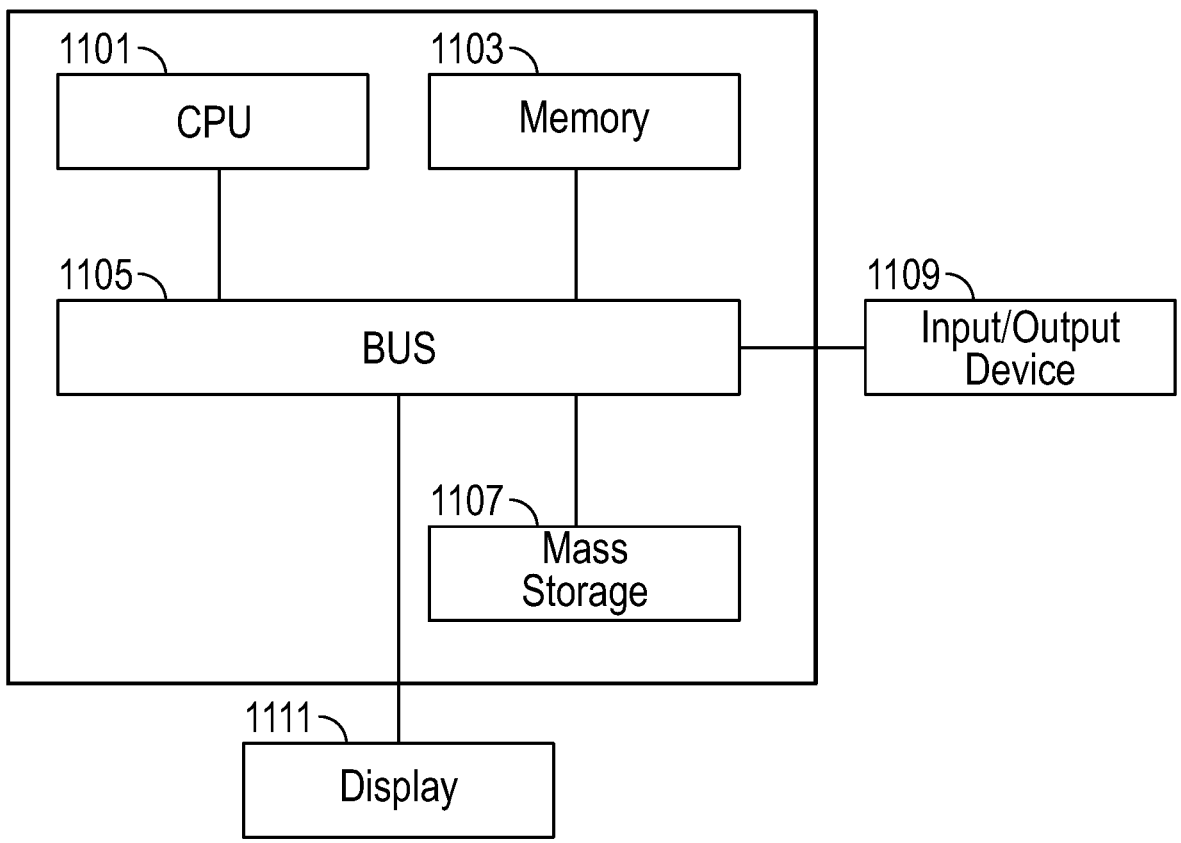
FIG. 11 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 11 is an illustration showing an exemplary computing device which may implement the embodiments described herein. The computing device of FIG. 11 may be used to perform embodiments of the functionality for the smart window control processes in accordance with some embodiments. The computing device includes a central processing unit (CPU) 1101, which is coupled through a bus 1105 to a memory 1103, and mass storage device 1107. Mass storage device 1107 represents a persistent data storage device such as a floppy disc drive or a fixed disc drive, which may be local or remote in some embodiments. Memory 1103 may include read only memory, random access memory, etc. Applications resident on the computing device may be stored on or accessed via a computer readable medium such as memory 1103 or mass storage device 1107 in some embodiments. Applications may also be in the form of modulated electronic signals modulated accessed via a network modem or other network interface of the computing device. It should be appreciated that CPU 1101 may be embodied in a general-purpose processor, a special purpose processor, or a specially programmed logic device in some embodiments.

Display 1111 is in communication with CPU 1101, memory 1103, and mass storage device 1107, through bus 1105. Display 1111 is configured to display any visualization tools or reports associated with the system described herein. Input/output device 1109 is coupled to bus 1105 in order to communicate information in command selections to CPU 1101. It should be appreciated that data to and from external devices may be communicated through the input/output device 1109. CPU 1101 can be defined to execute the functionality described herein to enable the functionality described with reference to FIGS. 1A-10. The code embodying this functionality may be stored within memory 1103 or mass storage device 1107 for execution by a processor such as CPU 1101 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system that is implemented with physical computing resources.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of controlling tint for a plurality of electrochromic devices, performed by a control system, comprising:
   receiving a request to change tint level of a plurality of electrochromic devices;
   identifying, in a memory of the control system, data structures having therein transfer functions for tint level relative to applied charge for each of the plurality of electrochromic devices, wherein at least one of the plurality of electrochromic devices has a transfer function for tint level relative to applied charge differing from at least one other of the plurality of electrochromic devices; and
   applying a charge to each of the plurality of electrochromic devices in accordance with the transfer functions, so as to coordinate tint level or rate of change of tint level across the plurality of electrochromic devices.

2. The method of claim 1, further comprising:
   determining an amount of charge to transfer to each of the plurality of electrochromic devices, based on a tint level in accordance with the request and based on the transfer functions.

3. The method of claim 1, further comprising:
   obtaining the transfer functions from a service via a network.

4. The method of claim 1, further comprising:
   monitoring current to or from each of the plurality of electrochromic devices;
   integrating the current to or from each of the plurality of electrochromic devices; and
   determining an amount of charge transferred to or from each of the plurality of electrochromic devices, based on the integrating the current, wherein the driving each of the plurality of electrochromic devices in accordance with the transfer functions is based on the determined amount of charge transferred to or from each of the plurality of electrochromic devices.

5. The method of claim 1, further comprising:
   determining a first one of the plurality of electrochromic devices is changing tint at a slower rate in the plurality of electrochromic devices;
   stopping changing tint of a second one of the plurality of electrochromic devices that is changing at a faster rate tint than the first one of the plurality of electrochromic devices, until the first one of the plurality of electrochromic devices attains a tint level of the stopped second one of the plurality of electrochromic devices; and
   resuming changing tint of the first and second ones of the plurality of electrochromic devices.

6. The method of claim 1, wherein the driving so as to coordinate the tint level or rate of change of tint level comprises:
   driving groups of electrochromic devices to make patterns switch levels of tint at a uniform rate or to a uniform level.

7. The method of claim 1, further comprising:
   adjusting rate of change of tinting to achieve more uniform tinting in at least one of the plurality of electrochromic devices as compared to most rapid tinting, wherein the driving so as to coordinate the tint level or rate of change of tint level is in accordance with the adjusted rate of change.

8. A controller with transmission level synchronization for electrochromic devices, comprising:
   a memory, configurable to store data structures having therein a plurality of transfer functions for tint level relative to drive of electrochromic devices; and
   one or more processors configurable to couple to at least a first electrochromic device and a second electrochromic device and to perform a method comprising:
      identifying a first data structure associated with a first transfer function for the first electrochromic device, and a second data structure associated with a second transfer function for the second electrochromic device; and
      applying a charge to the first electrochromic device in accordance with the first transfer function, and applying a charge to the second electrochromic device in accordance with the second transfer function, to coordinate rate of change of tint level of the first electrochromic device and rate of change of tint level of the second electrochromic device.

9. The controller of claim 8, wherein the one or more processors are further configurable to determine a first amount of charge to transfer to the first electrochromic device in accordance with the first transfer function, and a second amount of charge to transfer to the second electrochromic device in accordance with the second transfer function, based on a tint level for both the first electrochromic device and the second electrochromic device.

10. The controller of claim 8, wherein the one or more processors are further configurable to obtain the first transfer function and the second transfer function from a service via a network.

11. The controller of claim 8, wherein the one or more processors are further configurable to determine the first transfer function and the second transfer function based on user feedback.

12. The controller of claim 8, wherein:
the one or more processors are further configurable to determine an amount of charge transferred to or from each of the first electrochromic device and the second electrochromic device, based on integrating current to or from each of the first electrochromic device and the second electrochromic device; and
the driving the first electrochromic device and the second electrochromic device to coordinate the tint levels or rates of change of the first electrochromic device and the second electrochromic device is based on the determined amount of charge transferred to or from each of the first electrochromic device and the second electrochromic device.

13. The controller of claim 8, wherein the method further comprises:
determining the first electrochromic device is changing tint at a slower rate than the second electrochromic device;
stopping changing tint of the second electrochromic device until the first electrochromic device meets a tint level of the second electrochromic device; and
resuming changing tint of the second electrochromic device.

14. The controller of claim 8, wherein the one or more processors are further configurable to adjust rate of change of tinting and drive groups of electrochromic devices to make patterns switch levels of tint at a uniform rate or to a uniform level.

15. A method of controlling tint for a plurality of electrochromic devices, performed by a control system, comprising:
receiving a request to change tint level or color hue of a plurality of electrochromic devices;
identifying, in a memory of the control system, data structures having therein transfer functions for color hue relative to drive for each of the plurality of electrochromic devices; and
applying a charge to each of the plurality of electrochromic devices in accordance with the transfer functions, so as to coordinate color hue across the plurality of electrochromic devices.

16. The method of claim 15, wherein the applying comprises:
alternating bleaching and tinting at least one of the plurality of electrochromic devices, to match color hue of one or more of the plurality electrochromic devices to within a specified range.

17. The method of claim 15, further comprising:
determining one or more of the plurality of electrochromic devices is changing color hue at a slower rate in the plurality of electrochromic devices than at least one of the plurality of electrochromic devices;
stopping changing color hue of the at least one of the plurality of electrochromic devices, until the one or more of the plurality of electrochromic devices attains or exceeds a color hue of the at least one of the plurality of electrochromic devices; and
resuming changing color hue of the at least one of the plurality of electrochromic devices.

18. The method of claim 15, wherein the applying comprises driving at least two of the plurality of electrochromic devices from a single driver, by multiplexing or switching the single driver.

19. The method of claim 15, wherein the applying comprises driving the plurality of electrochromic devices from a plurality of drivers in parallel.

20. The method of claim 15, wherein the applying comprises driving two or more of the plurality electrochromic devices in series from a driver.

\* \* \* \* \*